US010129196B2

(12) United States Patent
Lee et al.

(10) Patent No.: US 10,129,196 B2
(45) Date of Patent: *Nov. 13, 2018

(54) HANDLING VARIOUS SCENARIOS WHERE AN EMAIL RECIPIENT IS NOT AVAILABLE

(71) Applicant: International Business Machines Corporation, Armonk, NY (US)

(72) Inventors: Wai Man Lee, Tai Po New Town (HK); Hon Chung Tang, Tseung Kwan O (HK); Ka Chun Wong, Tseung Kwan O (HK); Wing Kong Yip, North Point (HK)

(73) Assignee: International Business Machines Corporation, Armonk, NY (US)

(*) Notice: Subject to any disclaimer, the term of this patent is extended or adjusted under 35 U.S.C. 154(b) by 64 days.

This patent is subject to a terminal disclaimer.

(21) Appl. No.: 15/169,790

(22) Filed: Jun. 1, 2016

(65) Prior Publication Data

US 2016/0380939 A1    Dec. 29, 2016

Related U.S. Application Data

(63) Continuation of application No. 14/746,969, filed on Jun. 23, 2015.

(51) Int. Cl.
*H04L 12/58* (2006.01)
*H04L 29/12* (2006.01)
(Continued)

(52) U.S. Cl.
CPC ............ *H04L 51/14* (2013.01); *G06Q 10/107* (2013.01); *H04L 51/22* (2013.01); *H04L 51/28* (2013.01); *H04L 69/329* (2013.01)

(58) Field of Classification Search
CPC ......... H04L 51/14; H04L 51/22; H04L 51/28; H04L 69/329; G06Q 10/107
See application file for complete search history.

(56) References Cited

U.S. PATENT DOCUMENTS 6,654,789 B1    11/2003    Bliss et al.
6,684,238 B1    1/2004    Dutta
(Continued)

FOREIGN PATENT DOCUMENTS

CA    2577666 A1 *    8/2007    ............. H04L 51/00
CA    2577666 A1    8/2007
(Continued)

OTHER PUBLICATIONS

IBM, "List of IBM Patents or Patent Applications Treated as Related (Appendix P)," Oct. 3, 2016, p. 1-2.
(Continued)

*Primary Examiner* — Kostas J Katsikis
(74) *Attorney, Agent, or Firm* — Michael O'Keefe

(57) ABSTRACT

A method for sending a plurality of alternate contact information associated with an online communication system. The method may include receiving an electronic message associated with the online communication system, wherein the electronic message is addressed to a recipient from a sender. The method may also include identifying a recipient inbox using a plurality of directory information associated with the received electronic message. The method may further include determining the identified recipient inbox satisfies at least one of a plurality of alternate contact criteria. The method may also include transmitting a plurality of alternate recipient contact information within a simple message transfer protocol (SMTP) response to the sender based on the plurality of determined alternate contact criteria being satisfied.

7 Claims, 14 Drawing Sheets

(51) Int. Cl.
  *H04L 29/06* (2006.01)
  *H04L 29/08* (2006.01)
  *G06Q 10/10* (2012.01)

(56) References Cited

U.S. PATENT DOCUMENTS

| | | |
|---|---|---|
| 7,093,025 B1 | 8/2006 | Gupta |
| 7,379,421 B1 | 5/2008 | Gao et al. |
| 7,499,973 B2 | 3/2009 | Couts et al. |
| 8,108,475 B2 | 1/2012 | Jaladanki et al. |
| 8,346,879 B2 | 1/2013 | Meunier et al. |
| 8,406,745 B1 | 3/2013 | Upadhyay et al. |
| 8,458,261 B1 * | 6/2013 | Liao ............... H04L 51/30 709/206 |
| 8,554,843 B2 | 10/2013 | Aboel-Nil et al. |
| 8,601,064 B1 * | 12/2013 | Liao ............... H04L 51/12 709/206 |
| 8,756,286 B2 * | 6/2014 | Bayles ........... H04L 29/12594 709/206 |
| 9,276,881 B2 | 3/2016 | Alfarano et al. |
| 9,282,067 B2 | 3/2016 | Alfarano et al. |
| 9,313,151 B1 * | 4/2016 | Wheeler ............... G06Q 10/107 |
| 9,722,956 B2 | 8/2017 | Piccinini et al. |
| 9,817,979 B2 * | 11/2017 | Brennan, III ........... G06F 21/60 |
| 2001/0049745 A1 | 12/2001 | Schoeffler |
| 2002/0188620 A1 | 12/2002 | Doss et al. |
| 2003/0046296 A1 | 3/2003 | Doss et al. |
| 2004/0015554 A1 | 1/2004 | Wilson |
| 2004/0133561 A1 | 7/2004 | Burke |
| 2004/0205124 A1 | 10/2004 | Limprecht et al. |
| 2004/0205781 A1 | 10/2004 | Hill et al. |
| 2005/0021636 A1 | 1/2005 | Kumar |
| 2005/0132006 A1 | 6/2005 | Horvitz et al. |
| 2005/0188030 A1 | 8/2005 | Hudecek |
| 2005/0265319 A1 | 12/2005 | Clegg et al. |
| 2006/0015566 A1 | 1/2006 | Sampson |
| 2006/0168020 A1 * | 7/2006 | Brennan, III ..... H04L 29/12009 709/206 |
| 2007/0192418 A1 * | 8/2007 | Adams ................. H04L 51/00 709/206 |
| 2007/0192419 A1 * | 8/2007 | Vuong ................ G06Q 10/107 709/206 |
| 2008/0104175 A1 * | 5/2008 | Keohane ............. G06Q 10/107 709/206 |
| 2008/0104177 A1 | 5/2008 | Keohane et al. |
| 2008/0133302 A1 | 6/2008 | Brauninger et al. |
| 2009/0006557 A1 * | 1/2009 | Florkey ............... G06Q 10/107 709/206 |
| 2009/0150500 A1 | 6/2009 | Kumar et al. |
| 2009/0271486 A1 | 10/2009 | Ligh et al. |
| 2009/0327442 A1 | 12/2009 | Rosenfelt et al. |
| 2010/0146059 A1 | 6/2010 | DellaFera et al. |
| 2010/0175000 A1 * | 7/2010 | Gupta .................... H04L 51/14 715/753 |
| 2011/0087743 A1 | 4/2011 | Deluca et al. |
| 2011/0087744 A1 | 4/2011 | Deluca et al. |
| 2011/0161434 A1 | 6/2011 | Farrell et al. |
| 2011/0246580 A1 | 10/2011 | Goldman et al. |
| 2011/0302251 A1 * | 12/2011 | Meunier ............. G06Q 10/107 709/206 |
| 2011/0314109 A1 * | 12/2011 | Bayles ............. H04L 29/12594 709/206 |
| 2011/0320960 A1 * | 12/2011 | Cai ........................ H04L 51/02 715/752 |
| 2012/0191785 A1 * | 7/2012 | Vandeputte .......... G06Q 10/107 709/206 |
| 2013/0104229 A1 * | 4/2013 | Brennan, III ..... H04L 29/12009 726/22 |
| 2014/0067797 A1 * | 3/2014 | Kennedy ........ G06Q 10/063112 707/723 |
| 2014/0129648 A1 | 5/2014 | Bos et al. |
| 2014/0189020 A1 | 7/2014 | Alfarano et al. |
| 2014/0189024 A1 | 7/2014 | Alfarano et al. |
| 2014/0222711 A1 | 8/2014 | Tibbs et al. |
| 2015/0019910 A1 | 1/2015 | Simon et al. |
| 2016/0308840 A1 * | 10/2016 | Munshi ............... H04L 63/0428 |
| 2018/0068123 A1 * | 3/2018 | Brennan, III ........... H04L 51/28 |

FOREIGN PATENT DOCUMENTS

| | | | |
|---|---|---|---|
| EP | 1819112 A1 * | 8/2007 | ............. H04L 51/00 |
| EP | 1819112 A1 | 8/2007 | |
| WO | 0221421 A1 | 3/2002 | |

OTHER PUBLICATIONS

Lee et al., "Handling Various Scenarios Where an Email Recipient is Not Available," Application and Drawings, Filed on Jun. 23, 2015, 52 Pages, U.S. Appl. No. 14/746,969.

Mell et al., "The NIST Definition of Cloud Computing," National Institute of Standards and Technology, Sep. 2011, p. 1-3, Special Publication 800-145.

Melnikov, "Simple Mail Transfer Protocol extension for Alternate Recipient Delivery Option," Network Working Group Internet-Draft, Apr. 6, 2011, p. 1-15, IETF Trust.

Pending U.S. Appl. No. 14/746,969, filed Jun. 23, 2015, entitled; "Handling Various Scenarios Where an Email Recipient Is Not Available", pp. 1-52.

* cited by examiner

800

| From: | postmaster@xyc.com |
| Subject: | Alternate Contact Notification |
| To: | mary@xyz.com |

Your email: Subject: Monthly meet up

Has been delivered on 03-July-2015 at 09:33AM.

However, Joe is not available to access his e-mail from 01-July-2015 to 14-July-2015, though your message has been delivered.

Joe's comment: I don't have access from 01-July-2015 to 14-July-2015, please send me SMS @ 12345678

You can reach Joe by:

SMS @12345678   [SMS Joe now] ← 804

HANDLING VARIOUS SCENARIOS WHERE AN EMAIL RECIPIENT IS NOT AVAILABLE

FIELD OF INVENTION

The present invention relates generally to the field of computing, and more particularly to email systems.

BACKGROUND

Online communication systems may allow users to communicate through messaging across different devices. Types of online communication systems may include electronic mail, instant messaging systems, blog posting systems, electronic message forums and virtual conferencing systems.

Electronic mail, or email, includes the transmission of message of a communication network. An electronic mail system, or email system, may be a system capable of sending, receiving, and storing email messages in user email mailboxes, or inboxes. Additionally, email systems may be accessible from devices, such as desktops and laptops, and mobile devices, such as smartphones and tablets. Typical email messages may be produced by entering text via a keyboard and may include electronic files stored as attachments. Furthermore, email systems may use protocols, such as simple message transfer protocol (SMTP), Post Office Protocol 3 (POP3), and Internet Message Access Protocol (IMAP), to transfer email messages between computers processing various types of software and across different servers. SMTP may be a protocol used to send email messages. POP3 and IMAP may be protocols to receive email messages.

SUMMARY

According to one embodiment, a method for sending a plurality of alternate contact information associated with an online communication system. The method may include receiving an electronic message associated with the online communication system, wherein the electronic message is addressed to a recipient from a sender. The method may also include identifying a recipient inbox using a plurality of directory information associated with the received electronic message. The method may further include determining the identified recipient inbox satisfies at least one of a plurality of alternate contact criteria. The method may also include transmitting a plurality of alternate recipient contact information within a simple message transfer protocol (SMTP) response to the sender based on the plurality of determined alternate contact criteria being satisfied.

According to another embodiment, a computer system for sending a plurality of alternate contact information associated with an online communication system. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving an electronic message associated with the online communication system, wherein the electronic message is addressed to a recipient from a sender. The computer system may also include identifying a recipient inbox using a plurality of directory information associated with the received electronic message. The computer system may further include determining the identified recipient inbox satisfies at least one of a plurality of alternate contact criteria. The computer system may also include transmitting a plurality of alternate recipient contact information within a simple message transfer protocol (SMTP) response to the sender based on the plurality of determined alternate contact criteria being satisfied.

According to yet another embodiment, a computer program product for sending a plurality of alternate contact information associated with an online communication system. The computer program product may include one or more computer-readable storage devices and program instructions stored on at least one of the one or me tangible storage devices, the program instructions executable by a processor. The computer program product may include program instructions to receive an electronic message associated with the online communication system, wherein the electronic message is addressed to a recipient from a sender. The computer program product may also include program instructions to identify a recipient inbox using a plurality of directory information associated with the received electronic message. The computer program product may further include program instructions to determine the identified recipient inbox satisfies at least one of a plurality of alternate contact criteria. The computer program product may also include program instructions to transmit a plurality of alternate recipient contact information within a simple message transfer protocol (SMTP) response to the sender based on the plurality of determined alternate contact criteria being satisfied.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

FIG. 8 is a functional block diagram of a response message notifying an email sender of temporary alternate short message service contact information for a recipient, in accordance with one embodiment of the present invention.

DETAILED DESCRIPTION

Figure 1:
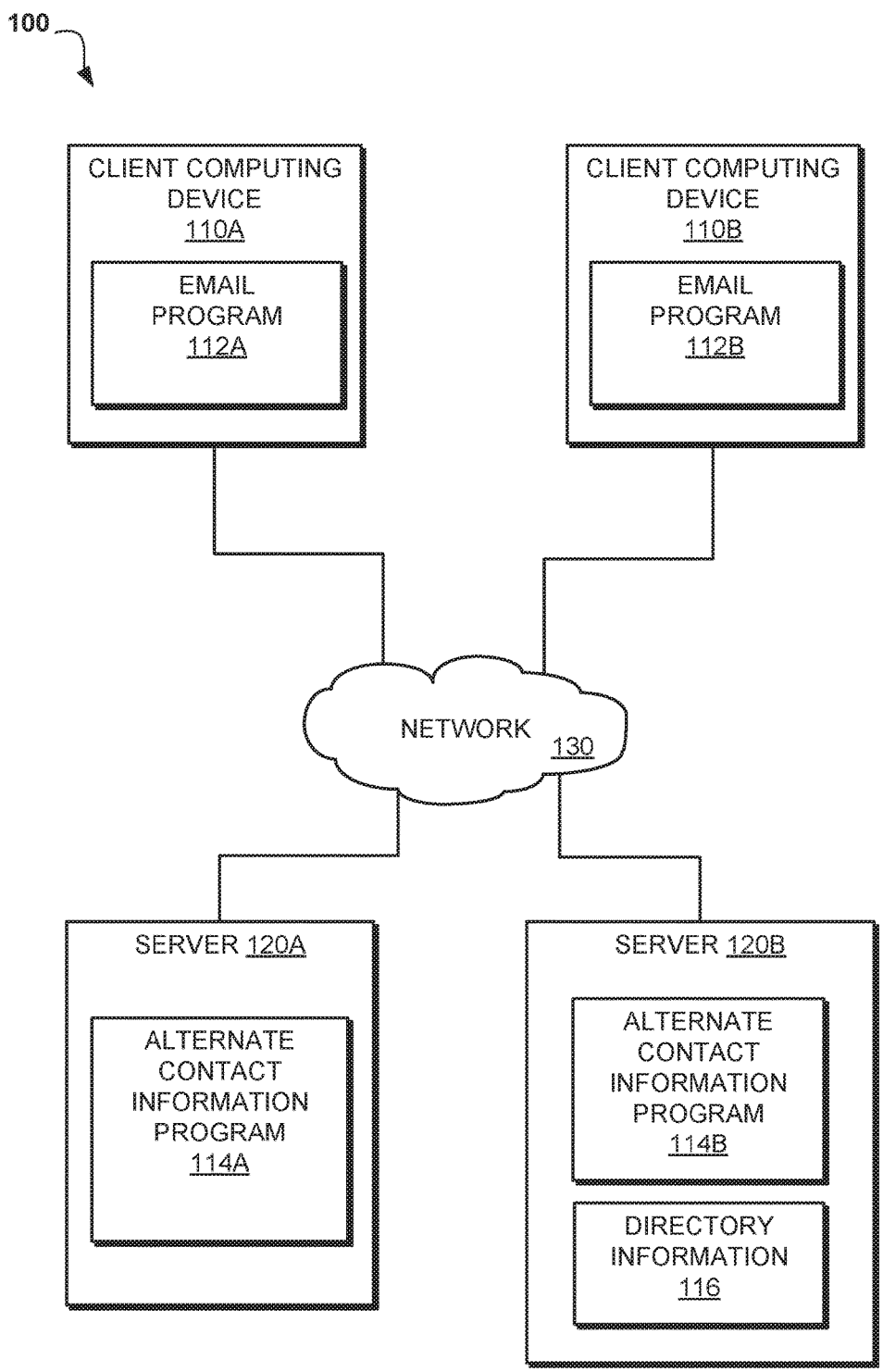
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to email systems. The following described exemplary embodiments provide a system, method, and program product to, among other things, send alternate contact information to an email sender using the recipient server when an email recipient is unavailable under various circumstances. Therefore, the present embodiment has the capacity to improve the technical field of email systems by limiting the expenditure of resources on the receiving email system. Furthermore, recipient alternate contact information may be sent to a sender even when the recipient mailbox, or inbox, no longer exists, such as when the recipient has left an employer or when a system failure event destroys the physical recipient email system.

As previously described, online communication systems, or online messaging systems, may allow users to communicate through messaging across different devices. Types of online communication systems may include electronic mail, instant messaging systems, blog posting systems, electronic message forums and virtual conferencing systems. Online communication systems may use protocols, such as SMTP, POP3, and IMAP, to transfer electronic messages between computers processing various types of software and across different servers. SMTP may be a protocol used to send electronic messages. POP3 and IMAP may be protocols to receive electronic messages. When a user sends an electronic message, the electronic message is transferred from a client computing device to an outgoing server, or sender server, via SMTP protocols. The sender server, by utilizing a Domain Name System (DNS) server, identifies transfer information, such as internet protocol (IP) addresses and mail exchange (MX) servers, associated with the recipient. Once the transfer information is identified, the sender server may transfer the electronic message to a target MX server, or recipient server, based on the domain associated with the electronic message. The recipient server may then transfer the electronic message to the recipient user for which the electronic message is intended based on the recipient's electronic mail address.

Under certain situations, an internet electronic message may not be able to reach the intended recipient. For example, an email message may be sent to an employee that has left a company, changed email addresses within the company, or the recipient's email storage quota has been reached and will not accept new incoming email messages. Similarly, temporary situations may arise where a recipient may not be able to read an electronic message for a period of time. For example, when an email recipient is out of the office for a specified period or a disaster, such as a disk failure, occurs and the recipient's mailbox is either temporarily or permanently destroyed.

If an individual is not able to regularly check an electronic mailbox, or electronic inbox, for a period of time, the individual may set up an out-of-office reply to be automatically sent whenever a new electronic message is received. While alternative contact information may be included in an out-of-office reply, the out-of-office reply notification may require the original electronic message to be delivered to the recipient user's electronic mailbox before sending out the out-of-office message. Therefore, an out-of-office reply notification may not be a possible solution for providing alternate contact information when the recipient's mailbox no longer exists, such as when the recipient is no longer employed by a company or after a complete system failure, or when the recipient's mailbox has reached a storage quota and is not accepting new messages. Even in a situation when an employer chooses to maintain a former employee's electronic mailbox, network bandwidth may be unduly encumbered by the receipt and subsequent distribution of out-of-office reply messages.

Additionally, "Find Me/Follow Me" technologies, such as Onebox (Onebox and all Onebox-based trademarks and logos are trademarks or registered trademarks of j2 Global Communications, Inc. and/or its affiliates), may allow incoming electronic messages, such as electronic mail messages, instant messages, and phone calls, to be received on different devices at the same time. However, under "Find Me/Follow Me" technologies, the receiving end of the message transaction may route the incoming messages to an appropriate destination device or devices. Therefore, the routing device on the receiving end may bear the cost burden of routing the messages, such as bandwidth and computing resources.

At times, a recipient may reach the full storage quota of the recipient's email mailbox. When the storage quota is reached, the electronic mailbox rejects delivery of new incoming electronic messages and does not provide any alternate contact information to the sender in order to contact the recipient.

During a disaster, such as system failure, the recipient's online communication system infrastructure may be lost or otherwise compromised thereby preventing incoming electronic messages from reaching the recipient's inbox. If the address of the failed electronic message inbox is the only contact information a sender has for an individual, the sender may not be able to reach the recipient since no alternate contact information may be sent to the sender in such a situation.

As discussed in the above circumstances, a recipient's mailbox may become unavailable to send or receive messages either temporarily or permanently. If the sender does not have any alternate contact information for the recipient, such situations may result in a sender not being able to contact a recipient in a timely manner. As such, it may be advantageous, among other things, to implement a system that allows a recipient server to provide alternate recipient contact information, such as alternate phone numbers and electronic mail addresses, to a sender within a simple message transfer protocol transaction response under preconfigured circumstances so a recipient may be contacted by the sender without delay.

According to one embodiment, a receiving server that transfers electronic messages to recipient mailboxes may be configured to return alternate contact information to electronic message senders when the recipient mailbox satisfies certain criteria, such as the recipient mailbox has reached a storage quota, the user has set an out-of-office reply, or when the recipient mailbox has been destroyed. The alternate contact information may be returned to the sender in an existing SMTP protocol response issued to the sending server without requiring the recipient mailbox to expend resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to send alternate contact information to an electronic message sender using the recipient server when a recipient is unavailable under various circumstances. According to at least one implementation, the present embodiment may allow a server on the receiving end of an electronic message to revert alternate contact information for a recipient user back to the sending server. Upon receiving an electronic message and before delivering the message to different recipient mailboxes according to the values of the "To:", "Cc:", and "Bcc:" fields, the recipient server may determine whether alternate contact information for a particular recipient should be returned to the sending server in an existing SMTP transaction response initiated by the sending server. Unlike when an electronic message is returned to a sender for an out-of-office reply, the electronic message may not enter the receiving mail system. Therefore, the alternate contact information may be returned at an early stage of the protocol conversation, thereby, conserving system resources. Additionally, when possible, the alternate contact information may be returned in the response using the "RCPT TO:" command in SMTP protocol, if the receiving host server determines the recipient information should be reverted.

Referring to FIG. 1, an exemplary networked computer environment 100 is depicted, in accordance with one embodiment. The networked computer environment 100 may include client computing device 110A, 110B and server 120A, 120B interconnected via communication network 130. According to at least one implementation, networked computer environment 100 may include a plurality of client computing devices 110A, 110B and servers 120A, 120B, only two of which are shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110A, 110B may be, for example, a mobile device, a telephone, a personal digital assistant, a netbook, a laptop computer, a tablet computer, a desktop computer, or any type of computing device capable of running a program and accessing a network. Client computing device 110A, 110B may be capable of hosting electronic message program 112A, 112B and communicating with server 120A, 120B via network 130, in accordance with one embodiment of the invention. As will be discussed with reference to FIG. 12, client computing device 110A, 110B may include internal components 1202a and external components 1204a, respectively.

Server computer 120A, 120B may be a laptop computer, netbook computer, personal computer (PC), a desktop computer, or any programmable electronic device capable of hosting alternate contact information program 114A, 114B, directory program 116, and communicating with client computing device 110A, 110B via network 130, in accordance with embodiments of the invention. As will be discussed with reference to FIG. 12, server computer 120A, 120B may include internal components 1202b and external components 1204b, respectively. Server 120A, 120B may also operate in a cloud computing service model, such as Software as a Service (SaaS), Platform as a Service (PaaS), or Infrastructure as a Service (IaaS). Server 120A, 120B may also be located in a cloud computing deployment model, such as a private cloud, community cloud, public cloud, or hybrid cloud.

According to the present embodiment, electronic message program 112A, 112B, such as Outlook® (Outlook and all Outlook-based trademarks and logos are trademarks or registered trademarks of Microsoft Corporation and/or its affiliates), may be a program capable of allowing a user to access and manage electronic message messages. Electronic message program 112A, 112B may allow for composition, delivery, and reception of electronic messages to and from other users via server 120A, 120B. Electronic message program 112A, 112B may include a web application, such as webmail, capable of providing management, composition, and reception functionality.

Directory information 116 may be a repository utilized to locate recipient transfer information, such as the location of a user's mailbox within a domain, user internet protocol addresses, and user electronic message addresses within a domain, in order to deliver the electronic message to a recipient's inbox.

Alternate contact information program 114A, 114B may be a program capable of sending alternate contact information for a recipient to a sender when the recipient mailbox associated with electronic message program 112A, 112B is unavailable or when the recipient may not view the electronic message for an extended period of time. Alternate contact information program 114A, 114B is explained in further detail below with respect to FIG. 2.

Figure 2:
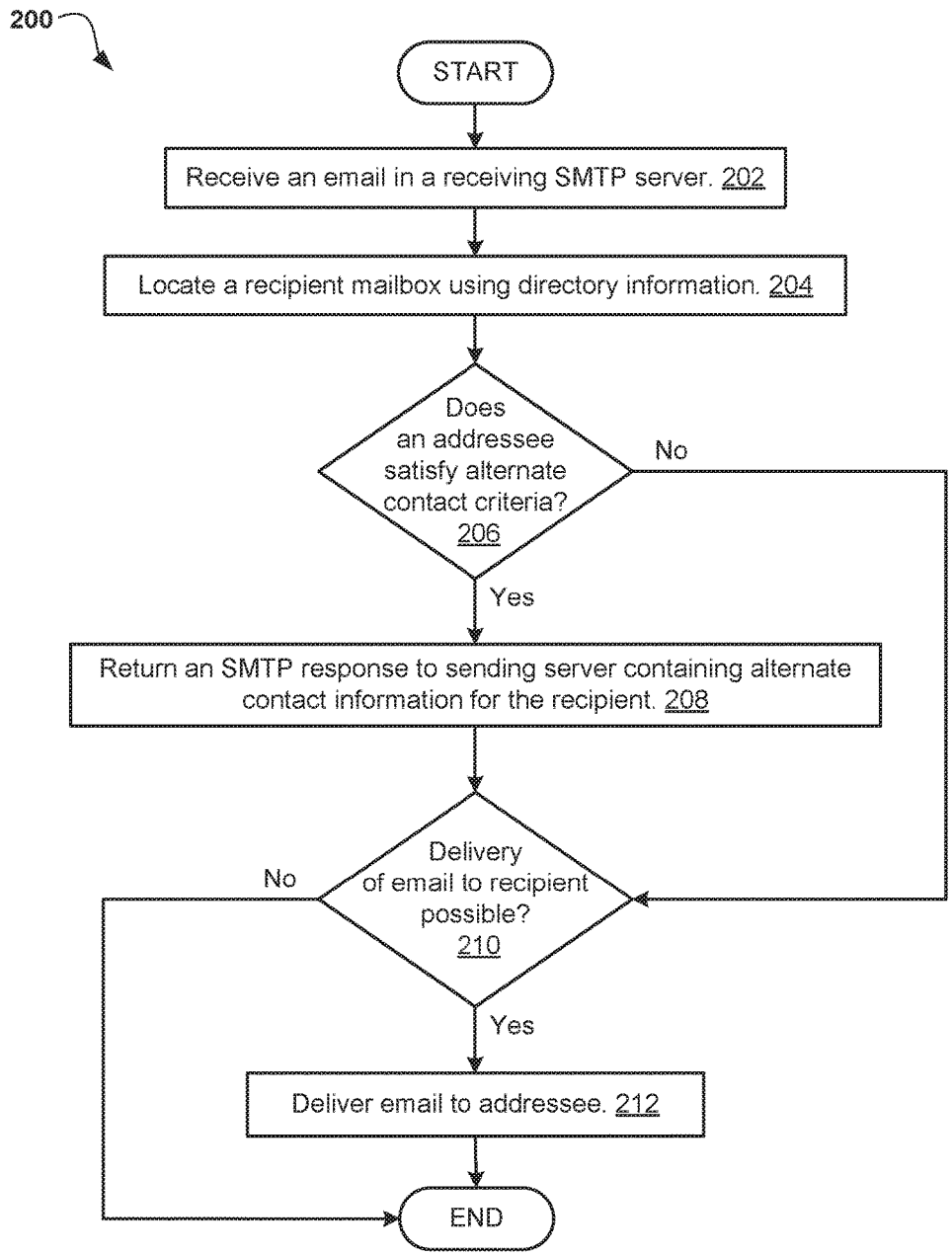
FIG. 2 illustrates a flowchart of the operational steps carried out by a program to provide alternate recipient contact information to an email sender, in accordance with one embodiment of the present invention.

Referring now to FIG. 2, a flowchart 200 illustrating the operational steps carried out by a program to provide alternate recipient contact information to an electronic message sender is depicted, in accordance with one embodiment of the present invention. At 202, an electronic message may be received by alternate contact information program 114A, 114B in recipient server 120B. For example, user A may compose and send an email addressed to user B. Based on the specified transfer information associated with user B's email address, the email message may be transmitted by sender server 120A to recipient server 120B via network 130.

Next at 204, alternate contact information program 114A, 114B may determine the recipient of the received electronic message and locate the recipient's mailbox using directory information 116. For example, if alternate contact information program 114A, 114B receives an email message, alternate contact information program 114A, 114B may identify user B as an addressed recipient of the received email and locate user B's mailbox using directory information 116.

Then at 206, alternate contact information program 114A, 114B may determine if preconfigured alternate contact criteria are satisfied. According to one implementation, the method may continue along operational flowchart 200, if preconfigured alternate contact criteria are satisfied. If alternate contact information program 114A, 114B determines the preconfigured alternate contact criteria are satisfied (step 206, "YES" branch), alternate contact information program 114A, 114B may continue to step 208 to send an SMTP response containing alternate contact information to an electronic message sender. If alternate contact information program 114A, 114B determines preconfigured alternate contact criteria are not satisfied (step 206, "NO" branch), alternate contact information program 114A, 114B may continue to step 210 to determine whether delivery of the received electronic message to the recipient mailbox is possible.

Alternate contact information program 114A, 114B may be preconfigured to send an SMTP response to sender server 120A that contains alternate contact information for an electronic message recipient under certain circumstances. For example, alternate contact information program 114A, 114B may be preconfigured to return alternate contact information for an email recipient to a sender when the recipient's mailbox is unavailable, such as when the mailbox storage quota is full or a system failure is being experienced. Furthermore, alternate contact information program 114A, 114B may be preconfigured by a system administrator to be sent when the recipient's mailbox is available but the recipient will not have access to the mailbox either temporarily or permanently. For example, if a company employee is away on extended leave or is no longer employed by the company, alternate contact information program 114A, 114B may be preconfigured to automatically distribute alternate contact information to the sender in order to allow contact with the recipient and/or recipient's direct supervisor.

Additionally, alternate contact information program 114A, 114B may be preconfigured to return specific alternate contact information depending on the message sender. For example, an email recipient may want to give out a personal cell phone number to a supervisor or important company clients when away on vacation. However, the recipient may only wish to give all other senders a short message service (SMS) phone number. Furthermore, alternate contact information for each recipient within a domain may be stored within directory information 116 and accessed by alternate contact information program 114A, 114B as needed.

Next at 208, alternate contact information program 114A, 114B may send an SMTP response to sending server 120A containing alternate contact information for the recipient. Once alternate contact information program 114A, 114B determines alternate contact information should be sent to a message sender, an SMTP response may be generated and sent to the sender that contains the alternate recipient contact information. The alternate contact information may be returned within a response to the "RCPT TO:" command in the SMTP protocol. Furthermore, the alternate contact information may be included in an existing SMTP response. For example, if a recipient is no longer employed at a company and the recipient's mailbox was not found, an SMTP code 550 message may be returned to the email sender that includes words "550 User not found" followed by alternate contact information for the recipient or the recipient's former supervisor. Additionally, alternate contact information may be returned to the sender using a newly created SMTP code. For example, if a user mailbox is unavailable for some reason, an SMTP code 580 message may be returned to the email sender that includes the words "580 User mailbox not available" followed by alternate contact information for the recipient. Furthermore, alternate contact information may be returned in a structured format so a sender SMTP server may be able to easily interpret and process the SMTP response containing the alternate contact information. For example, alternate contact information may be appended to an SMTP response under the following field names:

```
alternative-contact-info:{
    accept-email={yes|no},
    available-to-read={yes|no},
    alternative-email={alternative email address},
    email-delegate={email address for delegate},
    IM={info for instant messenger},
    SMS={phone number for SMS},
    Voice={voice phone number},
    Social-ID={info for social network},
    ValidFrom={start date when this alt contact info is valid},
    ValidTo={end date when this alt contact info is valid},
    Comment={text comment which provides additional info to the
    sender}
}
```

As an additional example, an SMTP conversation illustrating the return of alternate contact information to a sender with the email address bob@xyz.com for a recipient with the email address joe@example.com who is out of the office from Jul. 1, 2015 through Jul. 14, 2015 may appear as follows:

```
HELO client.example.com
> 250 Hello client.example.com
MAIL FROM: bob@xyz.com
> 250 2.1.0 bob@xyz.com....Sender OK
RCPT TO: joe@example.com
> 250 OK, alternative-contact-info:{
    accept-email=yes,
    available-to-read=no,
    alternative-email=joe@somewhere.com,
    email-delegate=sam@example.com,
    IM=Skype:joe.chan,
    SMS=93476543,
    Voice=93476274,
    Social-ID=https://www.facebook.com/joe.chan,
    ValidFrom=01-Jul-2015,
    ValidTo=14-Jul-2015,
    Comment="I don't have access from 01-Jul-2015 to 14-Jul-2015,
    please send me SMS @93476543"
}
RCPT TO: oliver@example.com
> 250 2.1.5 oliver@example.com
DATA
> 354 Send message content; end with <CRLF>.<CRLF>
from: bob@anywhere.com
to: joe@example.com
cc: oliver@example.com
subject: This is important!
```

Next at 210, alternate contact information program 114A, 114B may determine if the electronic message is deliverable to the recipient's mailbox. According to one implementation, the method may continue along operational flowchart 200, if the received electronic message is deliverable. If alternate contact information program 114A, 114B determines the message is deliverable (step 210, "YES" branch), alternate contact information program 114A, 114B may continue to step 212 to deliver the electronic message to the recipient's mailbox. If alternate contact information program 114A, 114B determines the electronic message is not deliverable (step 210, "NO" branch), alternate contact information program 114A, 114B may terminate.

Then at 212, alternate contact information program 114A, 114B may deliver the received electronic message to the recipient's mailbox. Once alternate contact information program has determined that none of the preconfigured alternate contact information criteria are satisfied (step 206) or has returned an SMTP response containing alternate recipient contact information (step 208) and determined the message is deliverable to the recipient's mailbox (step 210), alternate contact information program 114A, 114B may deliver the electronic message to the recipient's mailbox so that the recipient has access the electronic message. For example, if the recipient is away on a business trip but unable to access his otherwise accessible mailbox, alternate contact information program 114A, 114B may send an SMTP response to the sender containing alternate recipient contact information as well as deliver the email to the recipient's mailbox since the recipient's mailbox is available despite the recipient not having immediate access.

Figure 3:
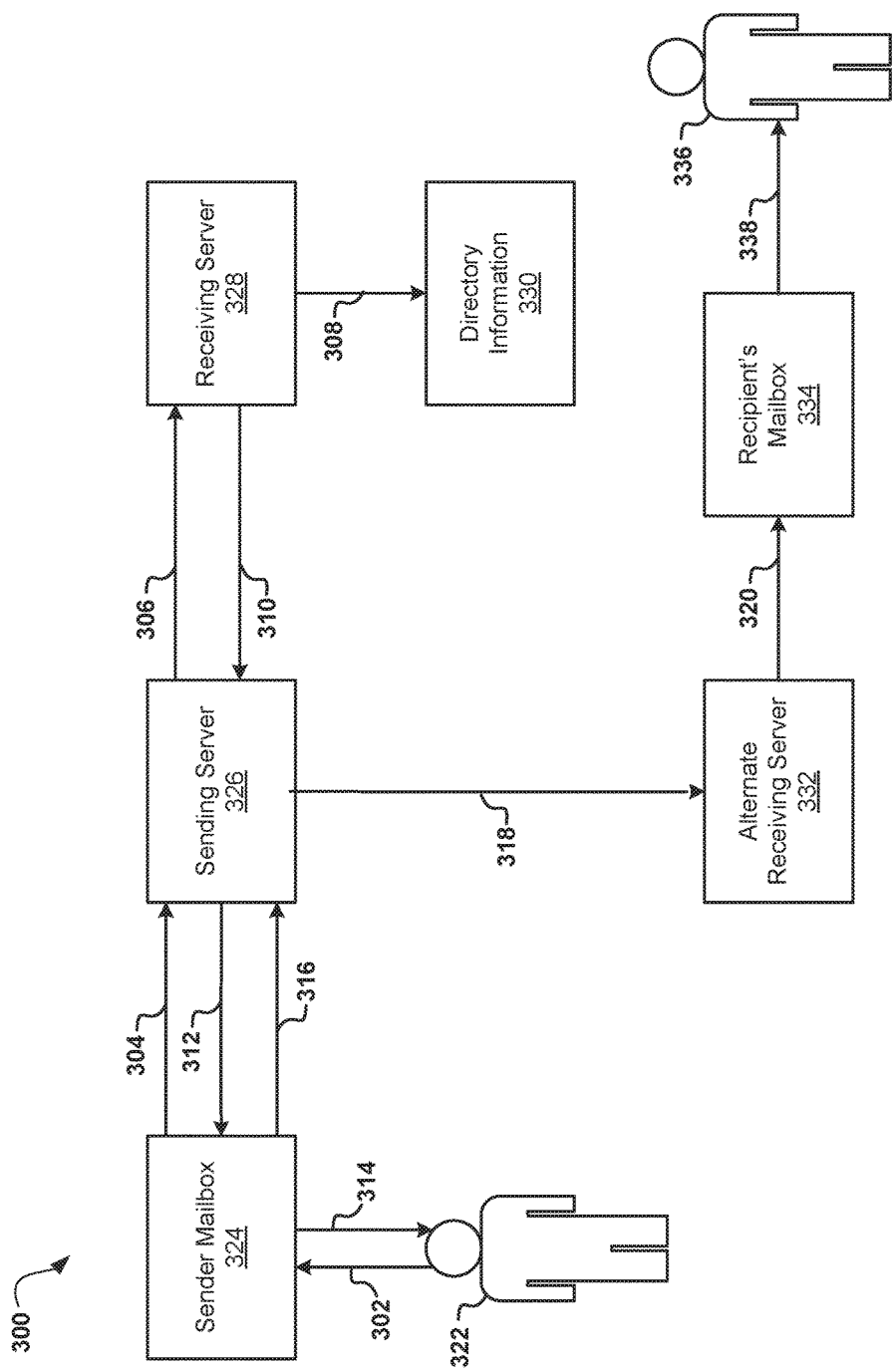
FIG. 3 is a functional block diagram of an alternate recipient contact information system providing an email sender permanent alternate contact information for a recipient, in accordance with one embodiment of the present invention.

Referring now to FIG. 3, a functional block diagram 300 of an alternate recipient contact information system providing an email sender permanent alternate contact information for a recipient is depicted, in accordance with one embodiment of the present invention. At 302, user Bob 322 may compose and send an email from sender mailbox 324 to a colleague, Joe 336, working at company X at the email address joe@example.com. At 304, when user Bob 322 sends the email, the message is transmitted from user Bob's mailbox 324 to sending server 326. At 306, sending server 326 may transmit the email message to receiving server 328, which may host alternate contact information program 114A, 114B, based on transfer information associated with the email address joe@example.com. At 308, alternate contact information program 114A, 114B may search directory information 330, maintained by a system administrator, for the location of a mailbox associated with the email address joe@example.com. At 310, if alternate contact information program 114A, 114B is unable to locate a mailbox for user Joe 336 associated with the email address joe@example.com due to the fact that Joe 336 is no longer working for company X, alternate contact information program 114A, 114B may include alternate contact information for Joe 336, such as an alternate email address of joe@somewhere.com, in the response of the SMTP transaction as follows:

```
550 User not found,
    alternative-contact-info:{
        accept-email=no,
        available-to-read=no,
        alternative-email=joe@somewhere.com,
        email-delegate=NULL,
        IM= NULL,
        SMS= NULL,
```

-continued

```
        Voice= NULL,
        Social-ID= NULL,
        ValidFrom= NULL,
        ValidTo= NULL,
        Comment= NULL
    }
```

At 312, sending server 326, upon getting the alternate contact information, may generate a notification email message containing the alternate contact information and deliver that to Bob's mailbox 324. At 314, Bob 322 may review the email message that includes the alternate contact information for Joe 336. At 316, Bob 322 may choose to resend the original email to the alternate email address of joe@somewhere.com and the resent email is transmitted from Bob's mailbox 324 to sending server 326. At 318, based on the transfer information associated with joe@somewhere.com, sending server 326 transmits the email message to alternate receiving server 332. At 320, alternate receiving server locates recipient mailbox 334 associated with joe@somewhere.com and delivers the email message to recipient mailbox 334. At 338, Joe 336 opens and reads the email message from Bob 322.

Figure 4:
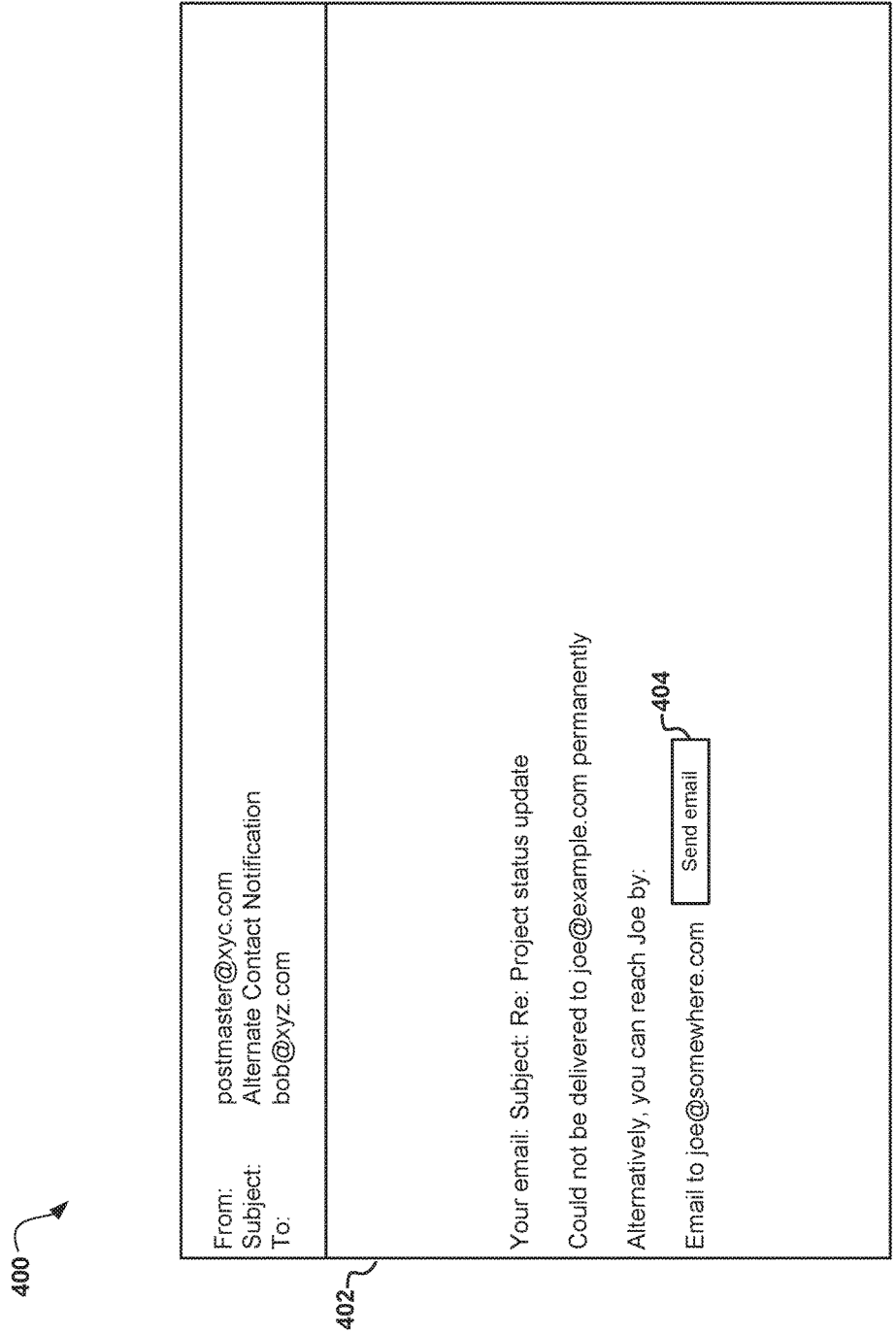
FIG. 4 is a functional block diagram of a response message notifying an email sender of permanent alternate email contact information for a recipient, in accordance with one embodiment of the present invention.

Referring now to FIG. 4, a functional block diagram 400 of a response message notifying an email sender of permanent alternate email contact information for a recipient is depicted, in accordance with one embodiment of the present invention. With respect to the example discussed in FIG. 3, sending server 326, may send notification message 402 to Bob 322, if alternate contact information program 114A, 114B is unable to locate a mailbox with the email address joe@example.com. Notification message 402 may include email link 404 to allow user Bob 322 to immediately forward the original email message to Joe 336 at the alternate email address joe@somewhere.com.

Figure 5:
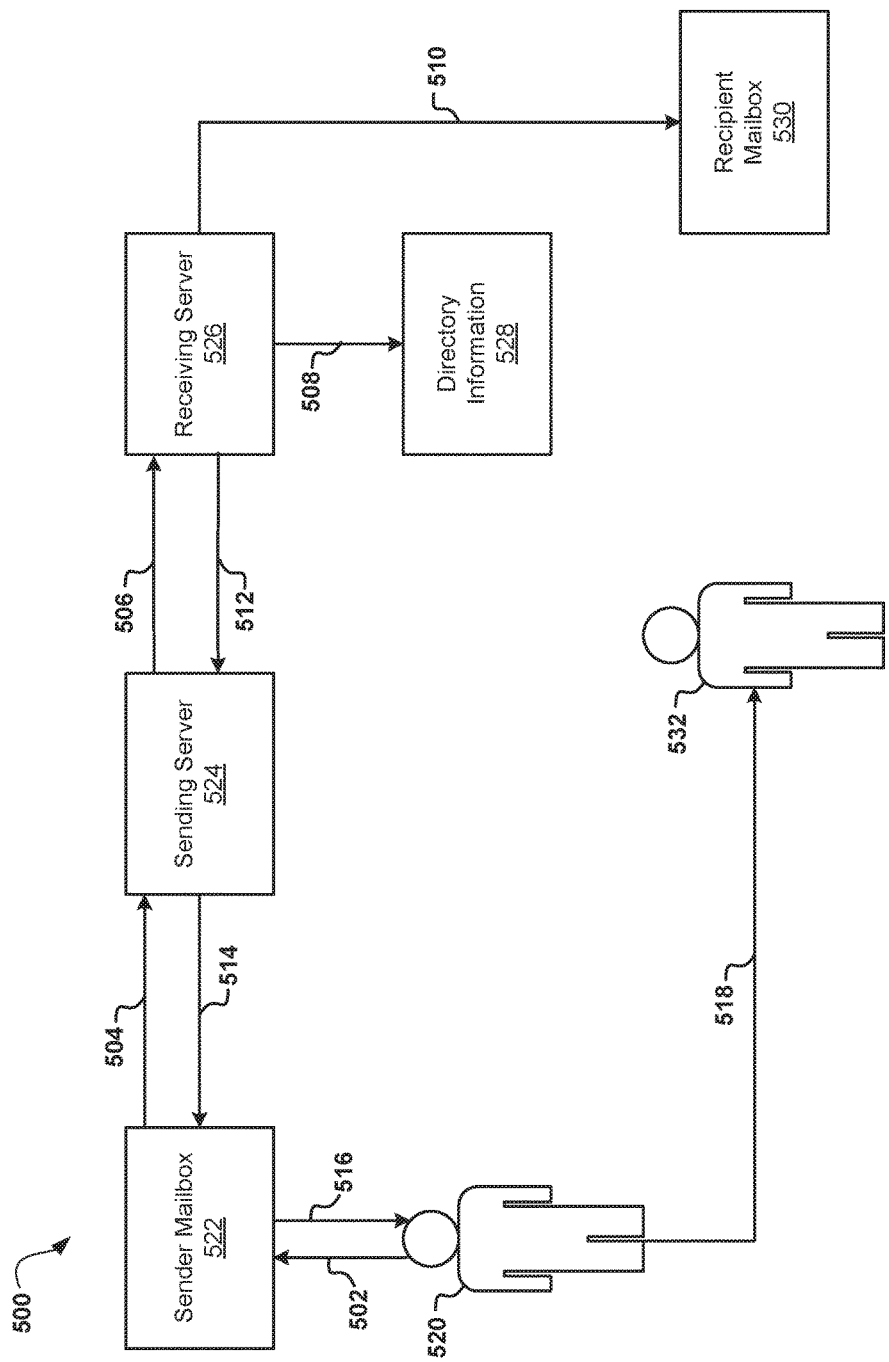
FIG. 5 is a functional block diagram of an alternate recipient contact information system providing an email sender temporary alternate recipient contact information specific to the sender, in accordance with one embodiment of the present invention.

Referring now to FIG. 5, a functional block diagram 500 of an alternate recipient contact information system providing an email sender temporary alternate recipient contact information specific to the sender is depicted, in accordance with one embodiment of the present invention. At 502, user Bob 520 may compose and send an email on Jul. 5, 2015 from sender mailbox 522 to a colleague, Joe 532, working at company X at the email address joe@example.com. At 504, when user Bob 520 sends the email, the message is transmitted from user Bob's mailbox 522 to sending server 524. At 506, sending server 524 may transmit the email message to receiving server 526, which may host alternate contact information program 114A, 114B, based on transfer information associated with the email address joe@example.com. At 508, alternate contact information program 114A, 114B may search directory information 528, maintained by a system administrator, for the location of a mailbox associated with the email address joe@example.com. At 510, if alternate contact information program 114A, 114B locates a recipient mailbox 530 associated with the email address joe@example.com, receiving server 526 may deliver the email message to recipient mailbox 530. At 512, if Joe 532 will not have access to recipient mailbox 530 from Jul. 1, 2015 through Jul. 14, 2015, alternate contact information program 114A, 114B may generate and return an SMTP response to sending server 524. Alternate contact information program 114A, 114B may include specific alternate contact information to the email sender since Joe 532 may wish to share different alternate contact information depending on the email sender.

The SMTP response containing alternate contact information for Joe 532, such as a private cellphone number and an SMS number, may be sent as follows:

```
550 User not found,
    alternative-contact-info:{
        accept-email=yes,
        available-to-read=no,
        alternative-email=NULL,
        email-delegate=NULL,
        IM= NULL,
        SMS= 12345678,
        Voice= 87654321,
        Social-ID= NULL,
        ValidFrom= 01-July-2015,
        ValidTo= 14-July-2015,
        Comment= "Bob, please call 87654321 for any urgent issue"
    }
```

If a sender other than Bob 520 sent Joe 532 the email, a different set of alternate recipient contact information may be returned in the SMTP response, since Joe 532 may wish for only Bob 520 to have the specific alternate recipient contact information given. At 514, sending server 524 may deliver a notification message containing the alternate contact information to Bob's mailbox 522. At 516, Bob 520 may review the notification message that includes the alternate contact information for Joe 532. At 518, Bob 520 may choose to contact Joe 532 using the alternate contact information provided in the notification message.

Figure 6:
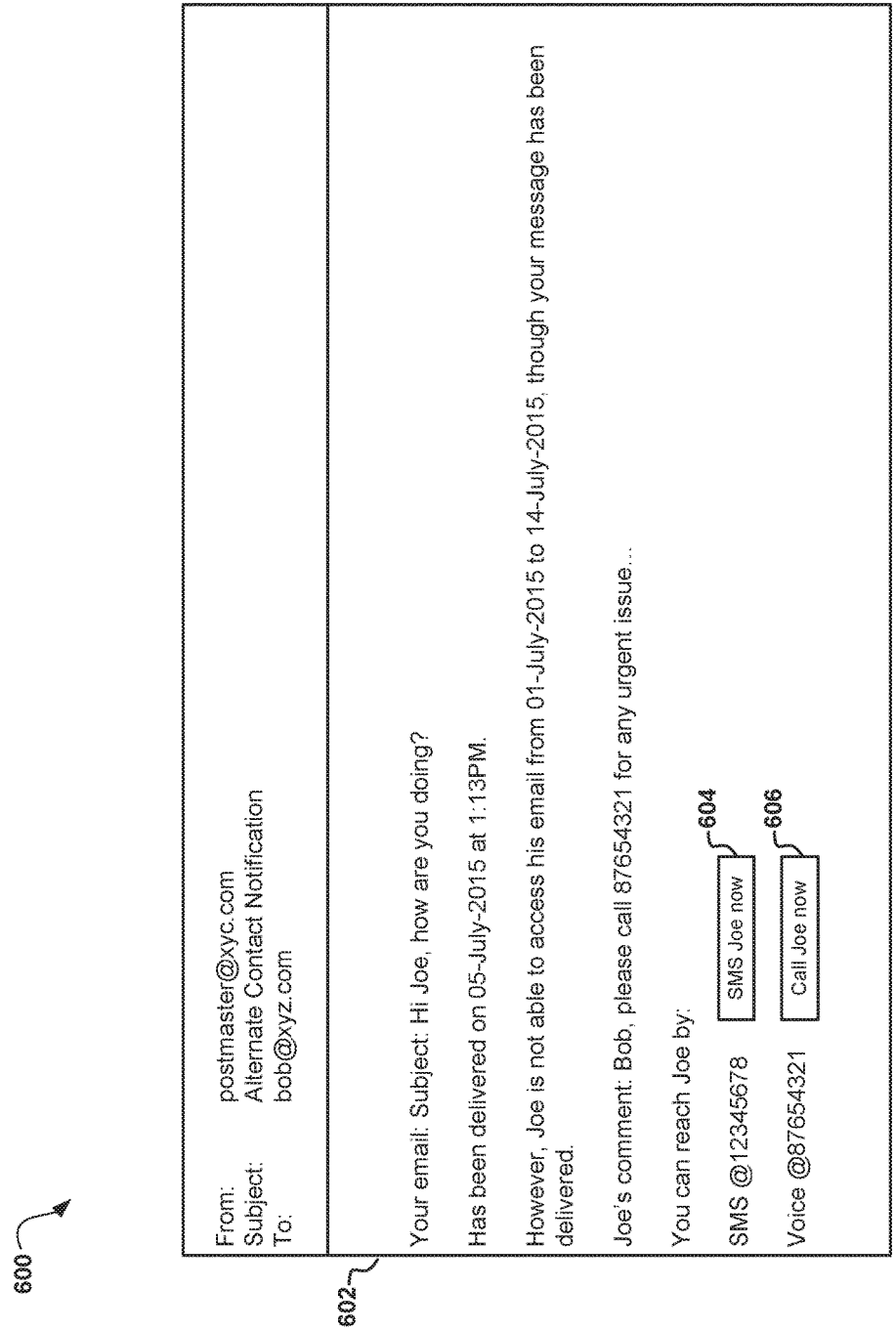
FIG. 6 is a functional block diagram of a response message notifying an email sender of temporary alternate telephonic contact information for a recipient, in accordance with one embodiment of the present invention.

Referring now to FIG. 6, a functional block diagram 600 of a message notifying an email sender of temporary alternate telephonic contact information for a recipient is depicted, in accordance with one embodiment of the present invention. With respect to the example discussed in FIG. 5, sending server 524 may send notification message 602 to Bob 520, if alternate contact information program 114A, 114B locates recipient mailbox 530 associated with the email address joe@example.com but Joe 532 will not have access to recipient mailbox 530 between Jul. 1, 2015 and Jul. 14, 2015. Notification message 602 may include SMS link 604 and voice link 606 to allow user Bob 520 to immediately contact Joe 532, if necessary.

Figure 7:
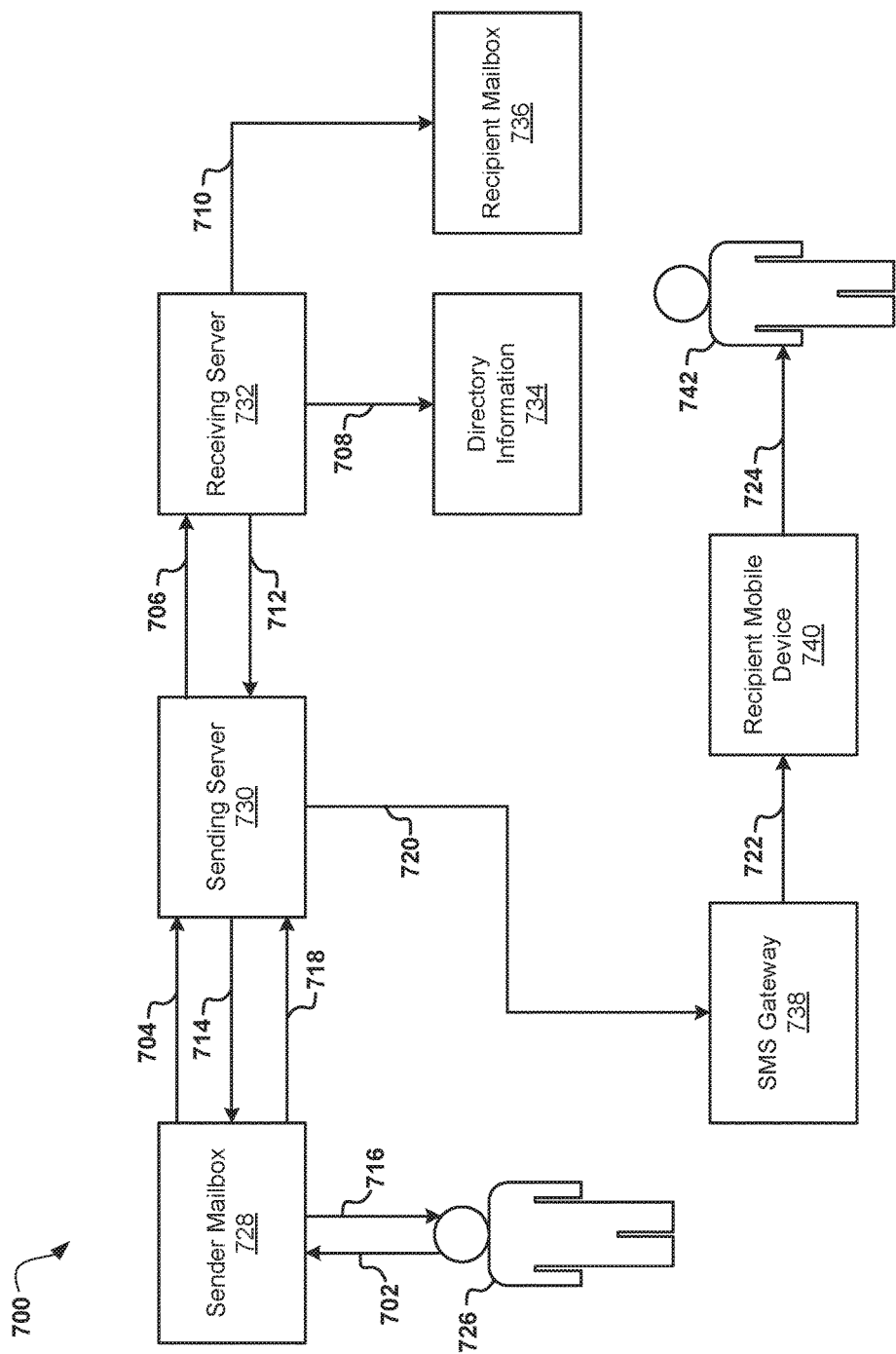
FIG. 7 is a functional block diagram of an alternate recipient contact information system providing an email sender temporary alternate short message service contact information for a recipient, in accordance with one embodiment of the present invention.

Referring now to FIG. 7, a functional block diagram 700 of an alternate contact system providing an email sender temporary alternate short message service contact information for a recipient is depicted, in accordance with one embodiment of the present invention. At 702, user Mary 726 may compose and send an email on Jul. 3, 2015 from sender mailbox 728 to a colleague, Joe 742, working at company X at the email address joe@example.com. At 704, when Mary 726 sends the email, the message is transmitted from Mary's mailbox 728 to sending server 730. At 706, sending server 730 may transmit the email message to receiving server 732, which may host alternate contact information program 114A, 114B, based on transfer information associated with the email address joe@example.com. At 708, alternate contact information program 114A, 114B may search directory information 734, maintained by a system administrator, for the location of a mailbox associated with the email address joe@example.com. At 710, if alternate contact information program 114A, 114B locates a recipient mailbox 736 associated with the email address joe@example.com, receiving server 732 may deliver the email message to recipient mailbox 736. At 712, if Joe 742 will not have access to recipient mailbox 736 from Jul. 1, 2015 through Jul. 14, 2015, alternate contact information program 114A, 114B may generate and send an SMTP response containing alternate contact information for Joe 742, such as an SMS number, to sending server 730 as follows:

```
550 User not found,
    alternative-contact-info:{
        accept-email=yes,
        available-to-read=no,
        alternative-email=NULL,
        email-delegate=NULL,
        IM= NULL,
        SMS= 12345678,
        Voice= NULL,
        Social-ID= NULL,
        ValidFrom= 01-July-2015,
        ValidTo= 14-July-2015,
        Comment= "I don't have email access from 01-July-2015 to 14-July-2015, please send me SMS @ 12345678"
    }
```

At 714, sending server 730 may deliver a notification message containing the alternate contact information to sender mailbox 728. At 716, Mary 726 may review the notification message that includes the SMS alternate contact information for Joe 742. At 718, Mary 726 may choose to send an SMS message to Joe 742 using the alternate contact information provided in the notification message. At 720, sending server 730 may transfer the SMS message to SMS Gateway 738. SMS Gateway may be a device that allows a computer, such as sending server 730, to send or receive SMS messages to or from a network, such as communication network 130. At 722, SMS Gateway 738 may transmit the SMS message from Mary 726 to recipient mobile device 740. At 724, Joe 742 may access and read the SMS message from Mary 726 on recipient mobile device 740.

Referring now to FIG. 8, a functional block diagram 800 of a response message notifying an email sender of temporary alternate short message service contact information for a recipient is depicted, in accordance with one embodiment of the present invention. With respect to the example discussed in FIG. 7, sending server 730 may send a notification message 802 to Mary 726, if alternate contact information program 114A, 114B locates recipient mailbox 736 associated with the email address joe@example.com but Joe 742 will not have access to recipient mailbox 736 between Jul. 1, 2015 and Jul. 14, 2015. Notification message 802 may include SMS link 804 to allow user Mary 726 to immediately send Joe 742 an SMS message.

Figure 9:
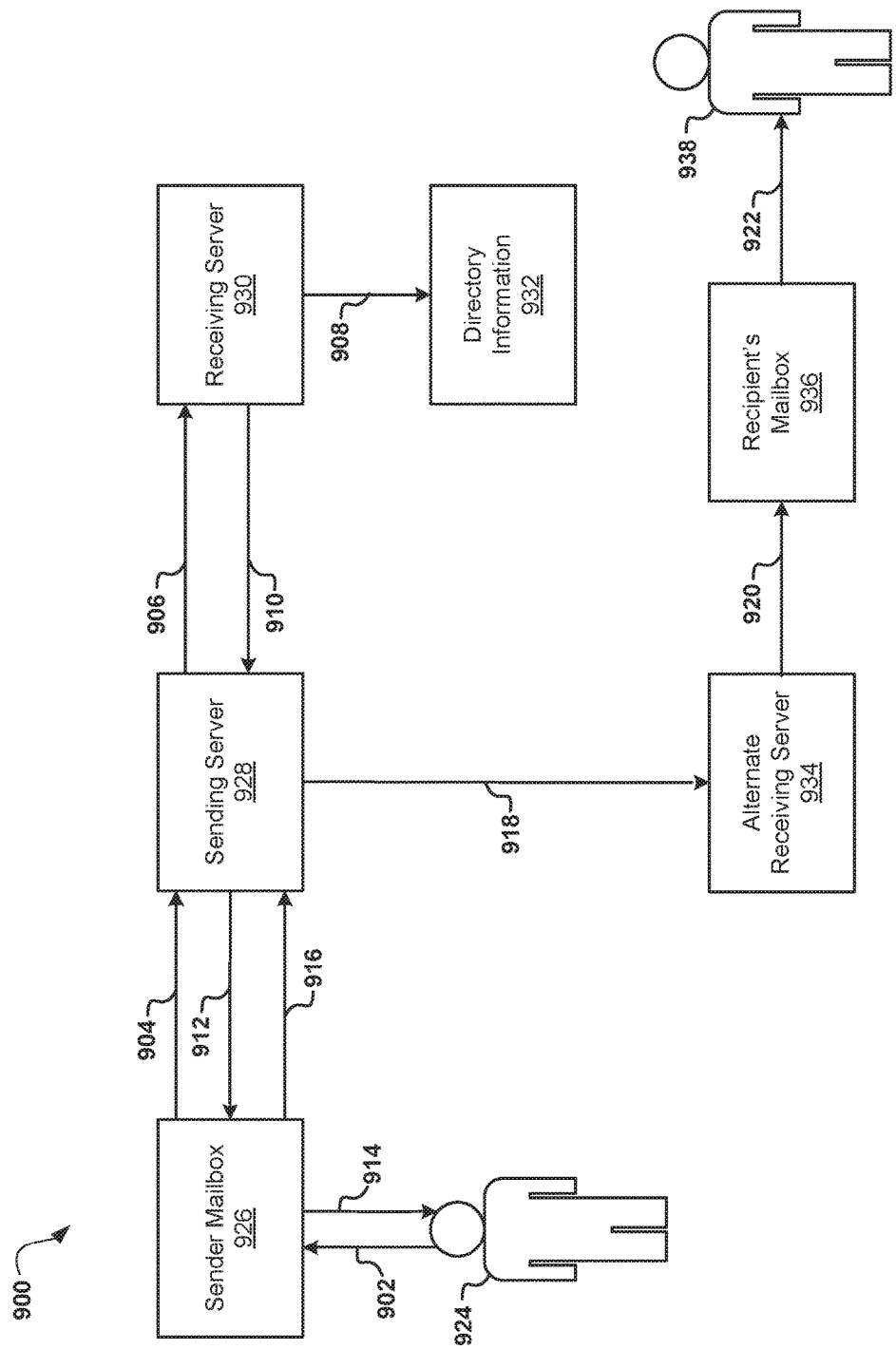
FIG. 9 is a functional block diagram of an alternate recipient contact information system forwarding a sender email to an alternate recipient email address during a recipient email system failure, in accordance with one embodiment of the present invention.

Referring now to FIG. 9, a functional block diagram 900 of an alternate contact system forwarding a sender email to an alternate recipient email address during a recipient email system failure is depicted, in accordance with one embodiment of the present invention. At 902, user Bob 924 may compose and send an email from sender mailbox 926 to a colleague, Joe 938, working at company X at the email address joe@example.com. At 904, when user Bob 924 sends the email, the message is transmitted from sender mailbox 926 to sending server 928. At 906, sending server 928 may transmit the email message to receiving server 930, which may host alternate contact information program 114A, 114B, based on transfer information associated with the email address joe@example.com. At 908, alternate contact information program 114A, 114B may determine a recipient mail system failure has occurred and search directory information 932 for alternate contact information associated with the email address joe@example.com. At 910, alternate contact information program 114A, 114B may generate and return an SMTP response to sending server 928. The SMTP response containing alternate contact information for Joe 938, such as an alternate email address, may be sent as follows:

```
550 User not found,
    alternative-contact-info:{
        accept-email=no,
        available-to-read=no,
        alternative-email=joe@somewhere.com,
        email-delegate=NULL,
        IM= Skype:joe,
        SMS= NULL,
        Voice= 12345678,
        Social-ID= NULL,
        ValidFrom= NULL,
        ValidTo= NULL,
        Comment= NULL
    }
```

At 912, sending server 928 may deliver a notification message containing the alternate contact information to sender mailbox 926. At 914, Bob 924 may review the notification message and compose and send an email to Joe 938 at the alternate email address of joe@somewhere.com as listed in the notification message. At 916, sender mailbox 926 may send the email message to sending server 928. At 918, sending server 928 may transmit the email message to alternate receiving server 934 based on transfer information associated with the alternate email address joe@somewhere.com. At 920, alternate receiving server 934 may deliver the email message to recipient mailbox 936. At 922, Joe 938 may access and read the email message send by Bob 924.

Figure 10:
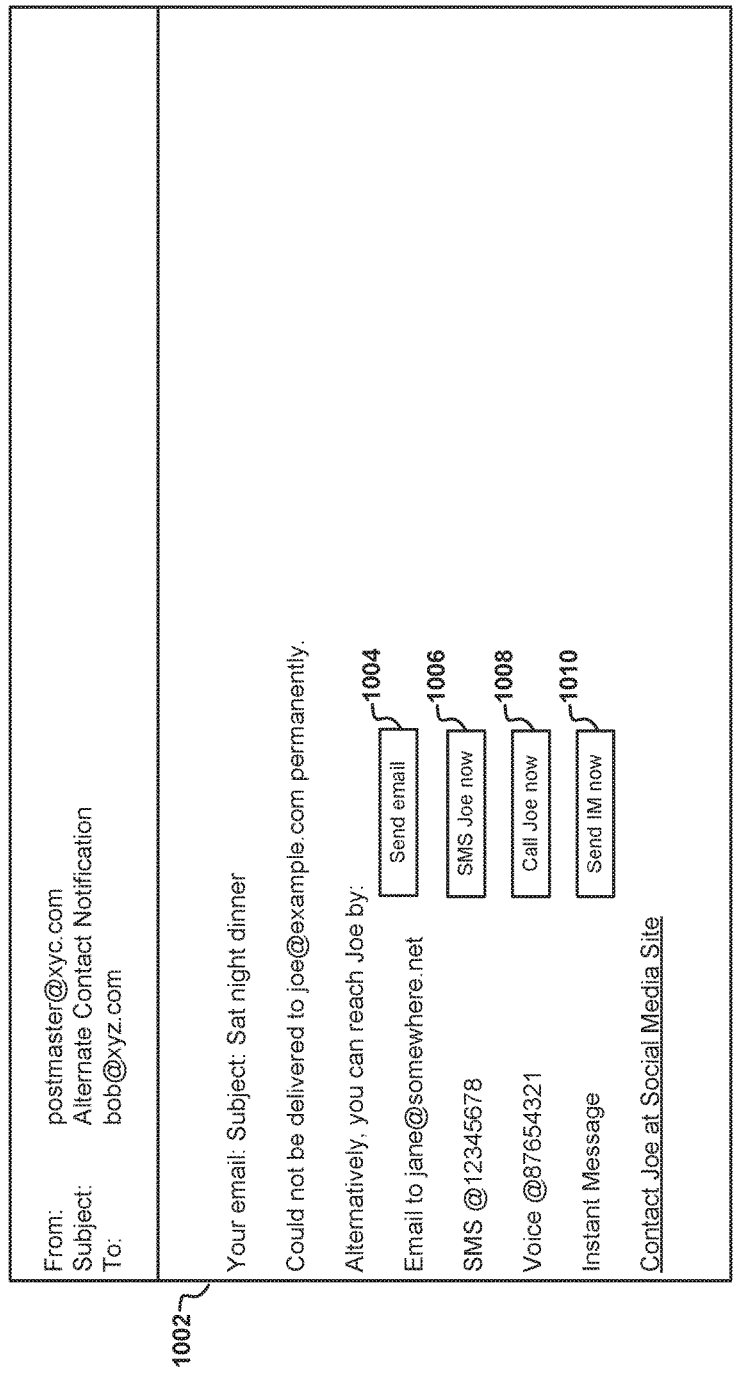
FIG. 10 is a functional block diagram of a response message notifying an email sender of all alternate contact information associated with a recipient, in accordance with one embodiment of the present invention.

Referring now to FIG. 10, a functional block 1000 diagram of a message notifying an email sender of all alternate contact information associated with a recipient is depicted, in accordance with one embodiment of the present invention. Sending server 928 may generate notification message 1002 that includes various alternate methods of contacting an intended message recipient, such as email, SMS, telephone, instant messaging, and social networking sites. Notification message 1002 may include an individual link to easily access alternate means of contact to an intended recipient, such as email link 1004, SMS link 1006, call link 1008, and instant messaging link 1010.

Figure 11:
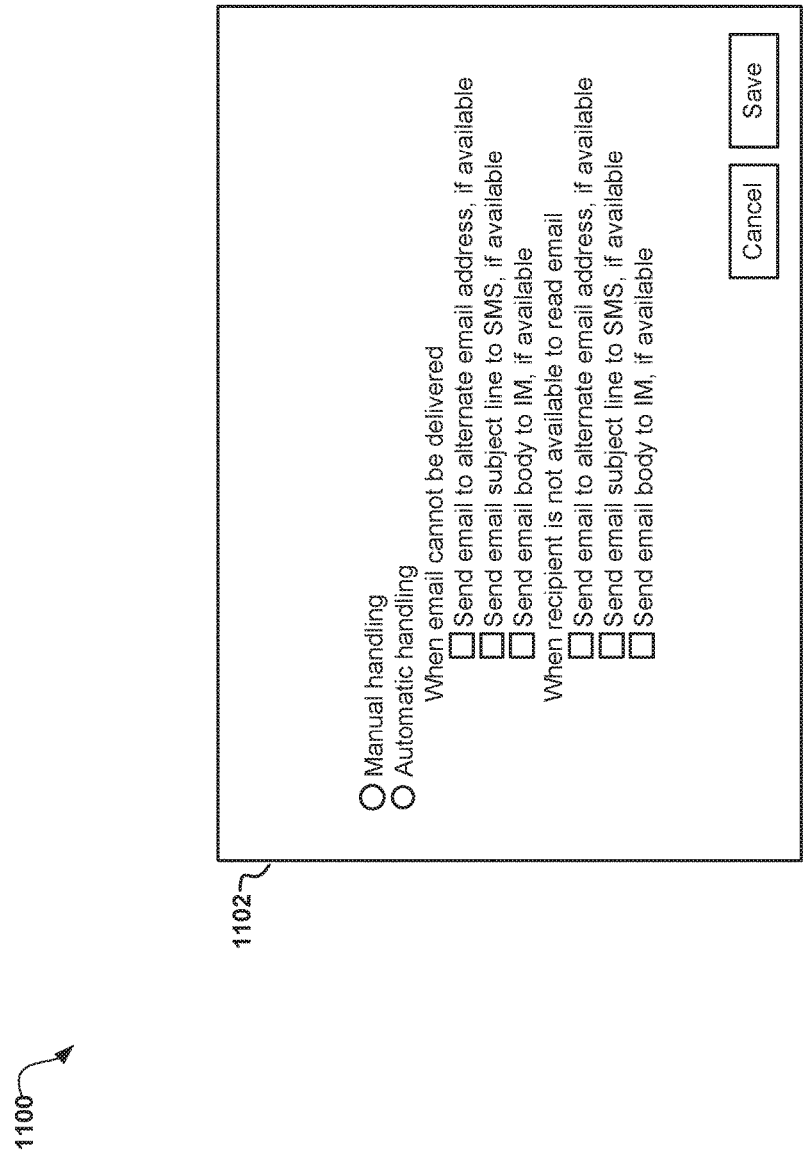
FIG. 11 is a functional block diagram of a graphical user interface displaying various automatic email handling settings for a sending server that receives an SMTP reply with alternate contact information, in accordance with one embodiment of the present invention.

Referring now to FIG. 11, a functional block diagram 1100 of a graphical user interface displaying various automatic electronic message handling settings for a sending server that receives an SMTP response with alternate contact information is depicted, in accordance with one embodiment of the present invention. A user, such as an electronic mailbox owner, may preconfigure alternate contact information program 114A, 114B in a sending server to process various elements of alternate contact information on behalf of the user that are received in an SMTP response by selecting appropriate options within settings menu 1102. Settings menu 1102 may allow a user to select preconfigured automatic handling options when a message is undeliverable to a recipient mailbox, such as when a system failure occurs, or when the user is not available to read the message, such as when the user is away on vacation. For example, when an electronic message is not deliverable to the user's inbox, a user may preconfigure alternate contact information program 114A, 114B in the sending server to automatically resend the original electronic message to an alternate address provided in an SMTP response containing an alternate recipient address. Similarly, if an electronic message is deliverable but the recipient is away on vacation and an SMTP response is returned that includes the recipient's SMS number, alternate contact information program 114A, 114B in the sending server may be preconfigured to automatically send an SMS message to the recipient's SMS number as provided in the SMTP response that notifies the recipient of the sender's electronic message. Furthermore, a mail system administrator on the sending side may configure the sending server to process the alternate contact information provided in an SMTP response.

Additionally, a message sender may preconfigure alternate contact information program 114A, 114B in a sending server to process alternate contact information differently depending on the message recipient returning an SMTP response with alternate contact information. For example, if a sender sends a message with user A addressed in the "To:" field and user B in the "Bcc:" field, the sender may only wish to automatically process alternate contact information for user A, since user A is the main intended recipient of the electronic message. Since user B is not a primary recipient of the electronic message, the sender may not wish to automatically process alternate contact information for user B received in a SMTP response message. Similarly, a message sender may preconfigure alternate contact information program 114A, 114B in the sending server to process alternate contact information received in an SMTP response when the original message sent by the message sender is marked as important or urgent.

Figure 12:
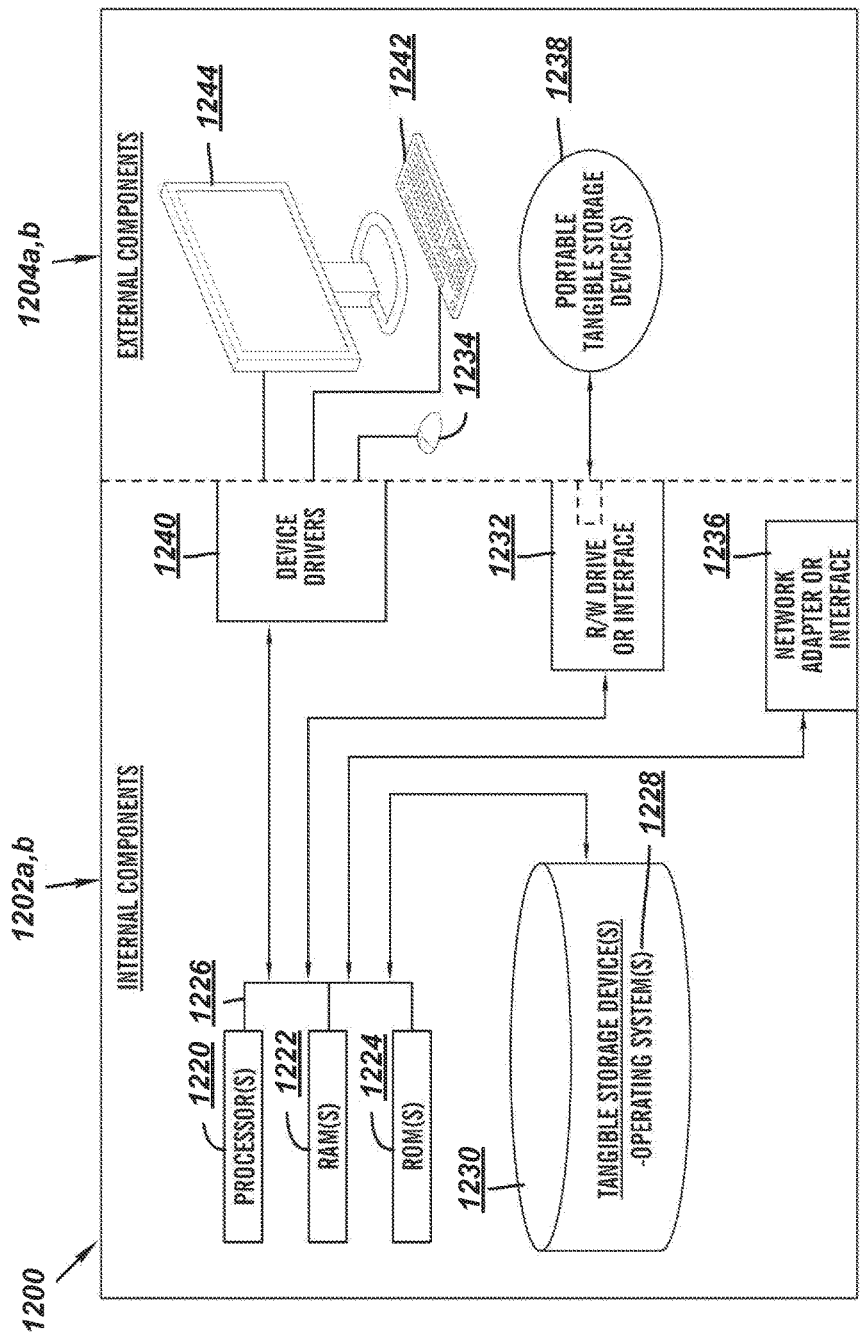
FIG. 12 depicts a cloud computing node according to an embodiment of the present invention.

FIG. 12 is a block diagram 1200 of internal and external components of computer 110A, 110B and server 120A, 120B depicted in FIG. 1 in accordance with an embodiment of the present invention. It should be appreciated that FIG. 12 provides only an illustration of one implementation and does not imply any limitations with regard to the environments in which different embodiments may be implemented. Many modifications to the depicted environments may be made based on design and implementation requirements.

Data processing system 1202, 1204 is representative of any electronic device capable of executing machine-readable program instructions. Data processing system 1202, 1204 may be representative of a smart phone, a computer system, PDA, or other electronic devices. Examples of computing systems, environments, and/or configurations that may represented by data processing system 1202, 1204 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

User client computer 110A, 110B and network server 120A, 120B may include respective sets of internal components 1202 a,b and external components 1204 a,b illustrated in FIG. 12. Each of the sets of internal components 1202 include one or more processors 1220, one or more computer-readable RAMs 1222 and one or more computer-readable ROMs 1224 on one or more buses 1226, and one or more operating systems 1228 and one or more computer-readable tangible storage devices 1230. The one or more operating systems 1228 and electronic message program 112A, 112B in client computer 110A, 110B; and alternate contact information program 114A, 114B in network server 120A, 120B are stored on one or more of the respective computer-readable tangible storage devices 1230 for execution by one or more of the respective processors 1220 via one or more of the respective RAMs 1222 (which typically include cache memory). In the embodiment illustrated in FIG. 12, each of the computer-readable tangible storage devices 1230 is a magnetic disk storage device of an internal hard drive. Alternatively, each of the computer-readable tangible storage devices 1230 is a semiconductor storage device such as ROM 1224, EPROM, flash memory or any other computer-readable tangible storage device that can store a computer program and digital information.

Each set of internal components 1202 *a,b* also includes a R/W drive or interface 1232 to read from and write to one or more portable computer-readable tangible storage devices 1238 such as a CD-ROM, DVD, memory stick, magnetic tape, magnetic disk, optical disk or semiconductor storage device. A software program, such as electronic message program 112A, 112B and alternate contact information program 114A, 114B can be stored on one or more of the respective portable computer-readable tangible storage devices 1238, read via the respective R/W drive or interface 1232 and loaded into the respective hard drive 1230.

Each set of internal components 1202 *a,b* also includes network adapters or interfaces 1236 such as a TCP/IP adapter cards, wireless Wi-Fi interface cards, or 3G or 4G wireless interface cards or other wired or wireless communication links. Electronic message program 112A, 112B in client computer 110A, 110B and alternate contact information program 114A, 114B in network server 120A, 120B can be downloaded to client computer 110A, 110B and network server 120A, 120B from an external computer via a network (for example, the Internet, a local area network or other, wide area network) and respective network adapters or interfaces 1236. From the network adapters or interfaces 1236, electronic message program 112A, 112B in client computer 110A, 110B and alternate contact information program 114A, 114B in network server 120A, 120B are loaded into the respective hard drive 1230. The network may comprise copper wires, optical fibers, wireless transmission, routers, firewalls, switches, gateway computers and/or edge servers.

Each of the sets of external components 1204 *a,b* can include a computer display monitor 1244, a keyboard 1242, and a computer mouse 1234. External components 1204 *a,b* can also include touch screens, virtual keyboards, touch pads, pointing devices, and other human interface devices. Each of the sets of internal components 1202 *a,b* also includes device drivers 1240 to interface to computer display monitor 1244, keyboard 1242 and computer mouse 1234. The device drivers 1240, R/W drive or interface 1232 and network adapter or interface 1236 comprise hardware and software (stored in storage device 1230 and/or ROM 1224).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 13:
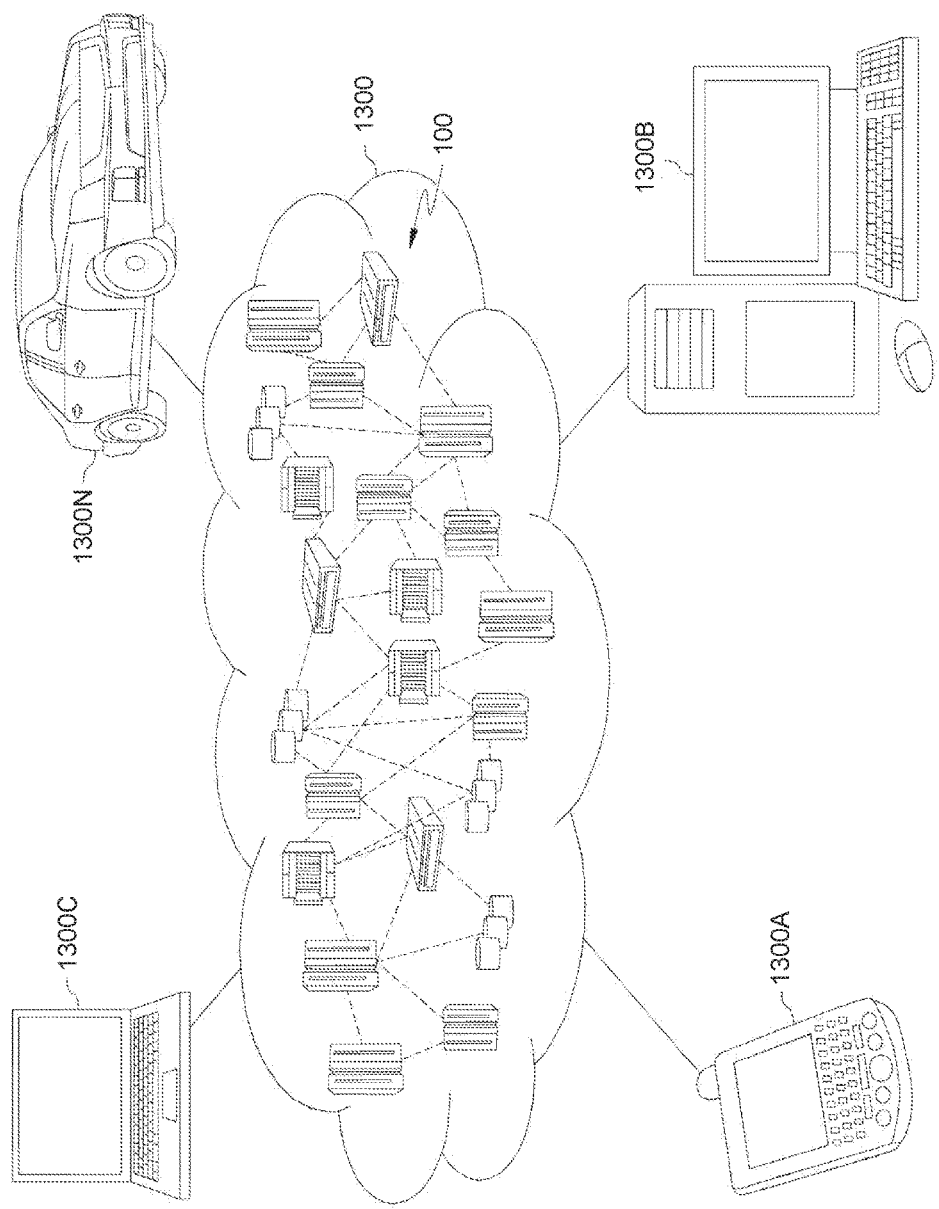
FIG. 13 depicts a cloud computing environment according to an embodiment of the present invention.

Referring now to FIG. 13, illustrative cloud computing environment 1300 is depicted. As shown, cloud computing environment 1300 comprises one or more cloud computing nodes 100 with which local computing devices used by cloud consumers, such as, for example, personal digital assistant (PDA) or cellular telephone 1300A, desktop computer 1300B, laptop computer 1300C, and/or automobile computer system 1300N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1300A-N shown in FIG. 13 are intended to be illustrative only and that computing nodes 100 and cloud computing environment 1300 can communicate with any type of computerized device over any type of network and/or network addressable connection (e.g., using a web browser).

Figure 14:
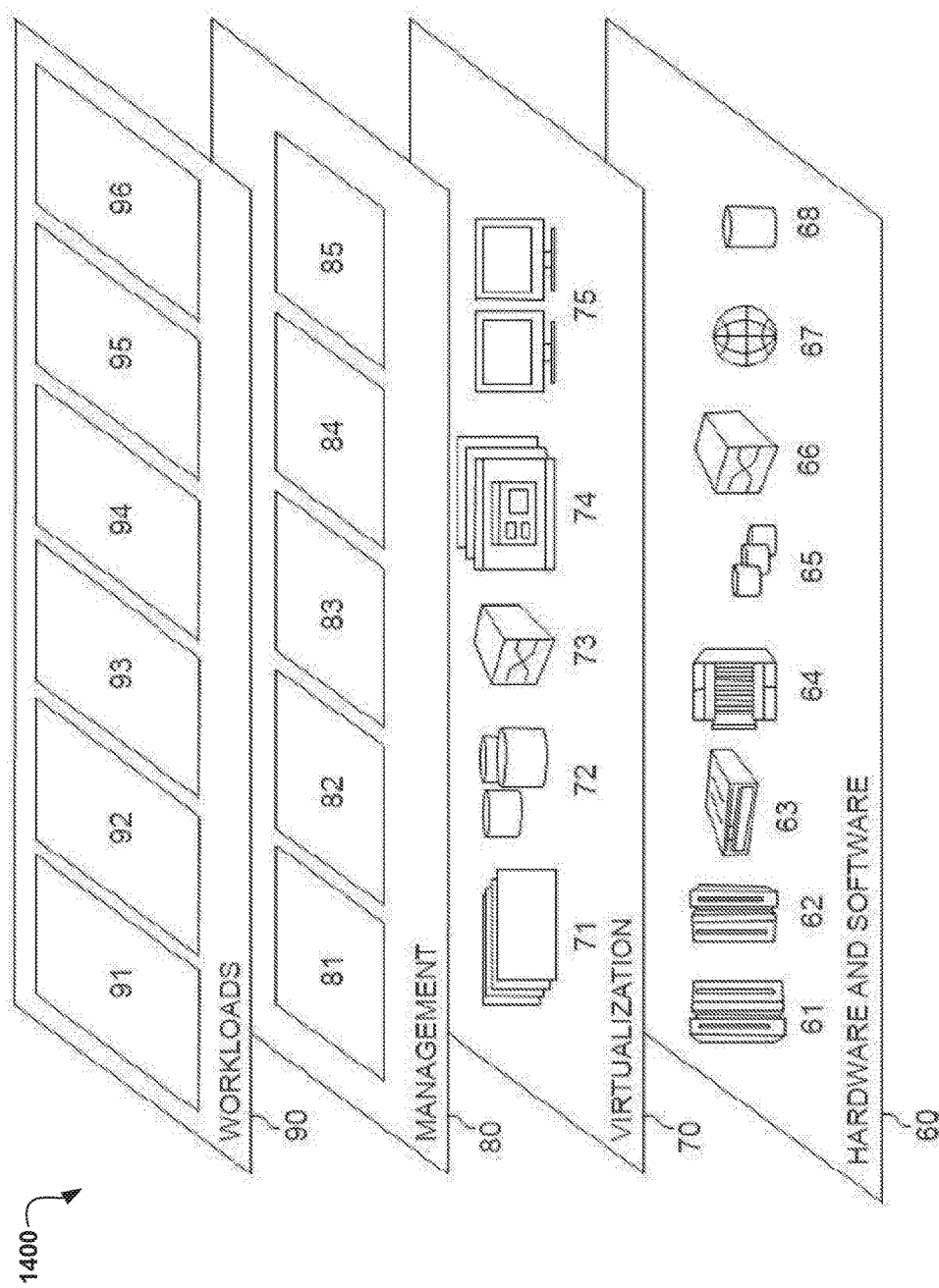
FIG. 14 depicts abstraction model layers according to an embodiment of the present invention.

Referring now to FIG. 14, a set of functional abstraction layers 1400 provided by cloud computing environment 1300 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sending alternate contact information 96. Alternate recipient contact information may be included in an SMTP reply message to a message sender. Furthermore, the message sender may review the SMTP reply when deciding whether to resend the original message to the recipient using the alternate contact information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for sending a plurality of alternate contact information associated with an online communication system, the method comprising:

receiving, by a simple message transfer protocol (SMTP) server, an electronic message associated with the online communication system, wherein the electronic message is addressed to a recipient from a sender;

identifying a recipient inbox within a recipient mail server using a plurality of directory information associated with the received electronic message, wherein the plurality of directory information is stored on the SMTP server associated with the online communication system, and also includes a plurality of alternate contact information for the recipient;

prior to attempting a transmission of the electronic message to the recipient mail server from the SMTP server, determining the identified recipient inbox satisfies at least one of a plurality of alternate contact criteria;

generating an SMTP response, after transmission and receipt of the electronic message in the SMTP server, that includes the plurality of alternate contact information for the recipient stored within the plurality of directory information on the server rather than transmitting the received electronic message to the identified recipient inbox or an alternate recipient; and transmitting the SMTP response to the sender through a sender mail server based on the plurality of determined alternate contact criteria being satisfied.

2. The method of claim 1, further comprising:

determining the electronic message is deliverable to the recipient inbox; and delivering the electronic message to the recipient inbox.

3. The method of claim 1, wherein the plurality of alternate recipient contact information includes at least one of an electronic mail address, a telephone number, a short message service number, a social media account, and an instant messaging screen name.

4. The method of claim 1, further comprising:
   delivering the transmitted plurality of alternate recipient contact information to a server associated with the sender.

5. The method of claim 1, further comprising:
   transmitting an electronic message to the recipient based on the plurality of alternate recipient contact information.

6. The method of claim 1, wherein the plurality of alternate contact criteria includes at least one of the recipient inbox achieving a full storage quota, a recipient online communication system being temporarily unavailable, the recipient inbox is permanently unavailable, the recipient inbox no longer exists, the electronic mail is undeliverable to the recipient inbox, and the recipient will not access the recipient inbox for a specific period of time.

7. The method of claim 1, wherein the plurality of directory information includes at least one of a plurality of electronic mail addresses, a plurality of internet protocol addresses, and a plurality of user electronic mail inbox locations.

* * * * *